United States Patent
Yoo et al.

(10) Patent No.: US 8,410,648 B2
(45) Date of Patent: Apr. 2, 2013

(54) MOTOR

(75) Inventors: Young Sun Yoo, Gyunggi-do (KR); Ho Jun Yoo, Gyunggi-do (KR); Yeol Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 151 days.

(21) Appl. No.: 12/929,430

(22) Filed: Jan. 24, 2011

(65) Prior Publication Data
US 2011/0187241 A1 Aug. 4, 2011

(30) Foreign Application Priority Data

Feb. 4, 2010 (KR) .................. 10-2010-0010534
Nov. 8, 2010 (KR) .................. 10-2010-0110477

(51) Int. Cl.
*H02K 7/14* (2006.01)
(52) U.S. Cl. ............... 310/67 R; 310/90; 310/91
(58) Field of Classification Search .............. 310/67 R, 310/90, 91
See application file for complete search history.

(56) References Cited

U.S. PATENT DOCUMENTS

| 6,420,805 B1 * | 7/2002 | Yamaguchi et al. ........ 310/67 R |
| 6,512,315 B1 * | 1/2003 | Yamaguchi ................... 310/51 |
| 7,382,068 B2 * | 6/2008 | Hsu et al. ...................... 310/51 |
| 8,212,459 B2 * | 7/2012 | Smirnov et al. ............. 310/425 |
| 2007/0228851 A1 | 10/2007 | Smirnov et al. |
| 2008/0079326 A1 | 4/2008 | Iwai et al. |

FOREIGN PATENT DOCUMENTS

| JP | 11-332162 | 11/1999 |
| JP | 3207764 | 7/2001 |
| JP | 2002-119013 | 4/2002 |
| JP | 2004-248337 | 9/2004 |
| KR | 2003-0024355 | 3/2003 |
| KR | 10-0716833 | 5/2007 |

* cited by examiner

*Primary Examiner* — Dang Le

(57) ABSTRACT

There is provided a motor including a sleeve supporting a shaft; a sleeve holder allowing the sleeve to be fixed to an inner circumferential surface thereof and having a coupling rack protruding downwardly from a bottom surface in an axial direction; and a base plate having a sleeve holder insertion hole provided therein such that the sleeve holder insertion hole has a curvature defined by an inner circumferential surface thereof, in contact with an outer circumferential surface of the coupling rack of the sleeve holder, and a bottom surface thereof, in contact with a coupling portion of the coupling rack.

10 Claims, 3 Drawing Sheets

MOTOR

CROSS-REFERENCE TO RELATED APPLICATIONS

This application claims the priorities of Korean Patent Application Nos. 10-2010-0010534 filed on Feb. 4, 2010 and 10-2010-0110477 filed on Nov. 8, 2010, in the Korean Intellectual Property Office, the disclosure of which is incorporated herein by reference.

BACKGROUND OF THE INVENTION

1. Field of the Invention

The present invention relates to a motor, and more particularly, to a motor allowing for a change in a coupling structure of a base plate and a sleeve holder to thereby enhance the internal rotational force and verticality of the sleeve holder on the base plate.

2. Description of the Related Art

In general, a spindle motor, installed inside an optical disk drive, rotates a disk so that an optical pick-up mechanism can read data recorded on the disk.

According to the related art, a spindle motor has a plurality of notches disposed around a sleeve holder insertion hole formed in a base plate. After a sleeve holder is inserted into the sleeve holder insertion hole, a coupling rack of the sleeve holder is subjected to caulking or spinning to thereby cause the sleeve holder to be fixed to the base plate.

The coupling rack of the sleeve holder is press-fitted to the notches, so an increase in internal rotational force may be realized within the sleeve holder.

When the sleeve holder is fixed to the base plate in the above-described manner, the coupling rack needs to be further press-fitted to wherever the notches are formed. This causes a problem in completing caulking or spinning.

Also, if the degree of press fitting is different in individual notches, the flatness of the base plate may be distorted.

In the case that the flatness of the base plate is distorted, the verticality of the sleeve holder on the base plate is reduced and the internal rotational force of the sleeve holder, induced by high-speed rotations, is also reduced.

SUMMARY OF THE INVENTION

An aspect of the present invention provides a motor allowing for a change in a coupling structure of a base plate and a sleeve holder to thereby enhance the internal rotational force and verticality of the sleeve holder on the base plate.

According to an aspect of the present invention, there is provided a motor including: a sleeve supporting a shaft; a sleeve holder allowing the sleeve to be fixed to an inner circumferential surface thereof and having a coupling rack protruding downwardly from a bottom surface in an axial direction; and a base plate having a sleeve holder insertion hole provided therein such that the sleeve holder insertion hole has a curvature defined by an inner circumferential surface thereof, in contact with an outer circumferential surface of the coupling rack of the sleeve holder, and a bottom surface thereof, in contact with a coupling portion of the coupling rack.

The sleeve holder insertion hole may have a shape corresponding to the outer circumferential surface of the coupling rack.

The inner circumferential surface of the sleeve holder insertion hole may be in contact with the outer circumferential surface of the coupling rack.

The sleeve holder may include an annular rim extending in an outer diameter direction so as to be in contact with an upper surface of the base plate, and a bottom surface of the rim and the upper surface of the base plate may be bonded by an adhesive.

The coupling portion may be fixed to the base plate by caulking or spinning.

The sleeve holder insertion hole may have a radius of curvature R satisfying 0.05 mm≦R1≦0.8 mm.

The coupling portion may have a height h satisfying h≦0.6 R, the height being from a bottom surface of the coupling portion to a bottom surface of the base plate in the axial direction.

The coupling portion may have a length L satisfying 0.4 R≦L≦1.2 R, the length extending from the inner circumferential surface of the sleeve holder insertion hole in an outer diameter direction.

According to another aspect of the present invention, there is provided a motor including: a rotor case receiving a disk; a shaft having a rotor case press-fitted thereto such that the shaft rotates in accordance with rotations of the rotor case; a sleeve supporting the shaft; a sleeve holder allowing the sleeve to be fixed to an inner circumferential surface thereof and having a coupling rack protruding downwardly from a bottom surface in an axial direction; and a base plate having a sleeve holder insertion hole having an inner circumferential surface subjected to a chamfering process and having the coupling rack inserted therein, wherein a coupling portion of the coupling rack is pressed and fixed to the inner circumferential surface of the sleeve holder insertion hole of the base plate in an outer diameter direction.

The base plate may have a curvature defined by a bottom surface thereof, in contact with the coupling portion, and the inner circumferential surface of the sleeve holder insertion hole.

The sleeve holder may include an annular rim extending in the outer diameter direction so as to be in contact with an upper surface of the base plate, and a bottom surface of the rim and the upper surface of the base plate may be bonded by an adhesive.

The coupling portion may be fixed to the base plate by caulking or spinning.

The sleeve holder insertion hole may have a radius of curvature R satisfying 0.05 mm≦R1≦0.8 mm.

The coupling portion may have a height h satisfying h≦10.6 R, the height being from a bottom surface of the coupling portion to a bottom surface of the base plate in the axial direction.

The coupling portion may have a length L satisfying 0.4 R≦L≦1.2 R, the length extending from the inner circumferential surface of the sleeve holder insertion hole in the outer diameter direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
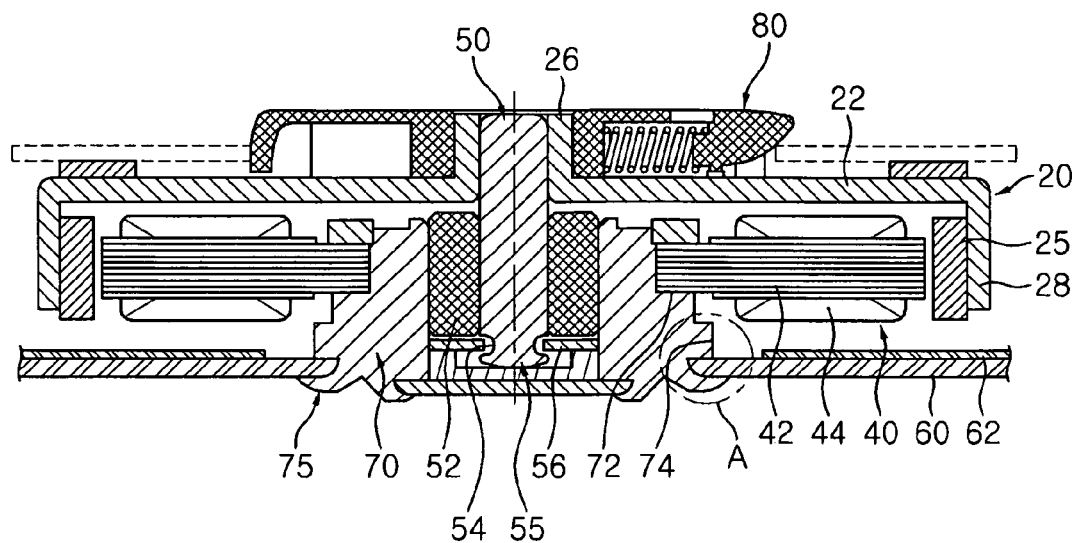
FIG. 1 is a schematic sectional view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same reference numerals will be used to designate the same or like components.

Figure 2:
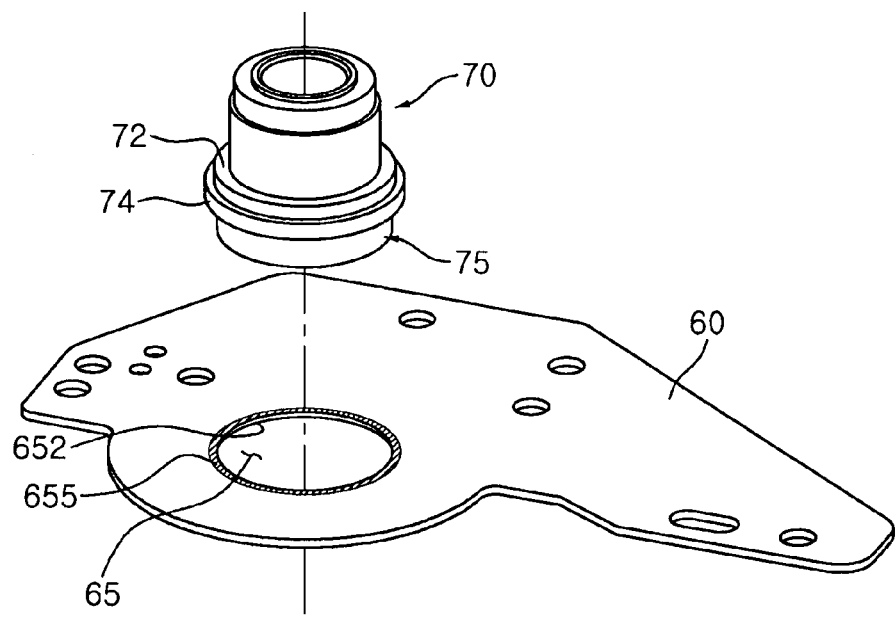
FIG. 2 is a schematic perspective view illustrating a base plate and a sleeve holder being exploded according to an exemplary embodiment of the present invention.
Figure 3:
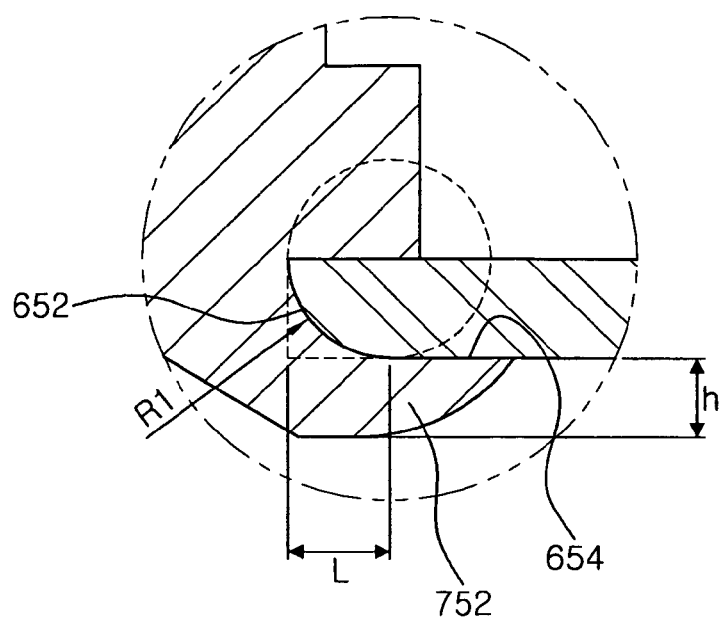
FIG. 3 is an enlarged sectional view of portion A of FIG. 1 according to an exemplary embodiment of the present invention.

FIG. 1 is a schematic sectional view illustrating a motor according to an exemplary embodiment of the present invention. FIG. 2 is a schematic perspective view illustrating a base plate and a sleeve holder being exploded according to an exemplary embodiment of the present invention. FIG. 3 is an enlarged sectional view of portion A of FIG. 1 according to an exemplary embodiment of the present invention.

With reference to FIGS. 1 through 3, a motor 10 according to an exemplary embodiment of the invention may include a sleeve 52, a sleeve holder 70 and a base plate 60.

Here, the motor 10 is a spindle motor that is applied to an optical disc drive rotating a disc D, and includes a rotor 20 and a stator 40.

The rotor 20 includes a rotor case 22 having a cup shape. The rotor case 22 includes a ring-shaped magnet 25 along the outer circumference thereof corresponding to a coil 44 of the stator 40. Here, the magnet 25 is a permanent magnet that has north and south magnetic poles magnetized alternately in a circumferential direction to thereby generate a predetermined level of magnetic force.

The rotor case 22 includes a rotor hub 26 being press-fitted and coupled to a shaft 50 and a magnet coupling portion 28 having the ring-shaped magnet 25 disposed on the inner circumferential surface thereof. The rotor hub 26 is bent upwardly in an axial direction in order to maintain unmating force with the shaft 50. A chucking device 80 is coupled to the outer circumferential surface of the rotor hub 26 in order to load the disc D.

The stator 40 is constituted of stationary parts except for rotating parts. The stator 40 includes a base plate 60, a sleeve holder 70, a stator core 42 and a winding coil 44. A printed circuit board (PCB) 62 is mounted on the base plate 60. The sleeve holder 70 supports a sleeve 52 by press-fitting the sleeve 52 thereto. The stator core 42 is fixed to the sleeve holder 70. The winding coil 44 is wound around the stator core 42.

The magnet 25, provided along the inner circumferential surface of the magnet coupling portion 28, is disposed to face the winding coil 44. Electromagnetic interaction between the magnet 25 and the winding coil 44 induces the rotation of the rotor 20. In order words, when the rotor case 22 rotates, the shaft 50 interlocked with the rotor case 22 rotates.

Meanwhile, terms used herein associated with directions will now be defined. As viewed in FIG. 1, the axial direction refers to a vertical direction on the basis of the shaft 50, and an outer diameter direction or an inner diameter direction refers to a direction towards the outer end of the rotor 20 on the basis of the shaft 50 or a central direction of the shaft 50 on the basis of the outer end of the rotor 20.

The shaft 50 may have a lower portion 55 being exposed under the sleeve 52 in the axial direction. Herein, in order to prevent the shaft 50 from being separated from the sleeve 52 due to the high-speed rotations of the rotor case 22, a stopper ring coupling recess 54 coupled to a stopper ring 56 disposed on the bottom surface of the sleeve 52 may be formed in the lower portion 55 of the shaft 50.

The sleeve holder 70 according to this embodiment may have the sleeve 52, supporting the shaft 50, press-fitted thereto. The sleeve holder 70 may include a receiving portion 72 extending in the outer diameter direction and being stepped so as to allow the stator core 42 to be received in the outside of the sleeve holder 70.

Also, the sleeve holder 70 may include a coupling rack 75 protruding downwardly from the bottom surface in the axial direction and being coupled to the base plate 60. The sleeve holder 70 may include an annular rim 74 extending in the outer diameter direction so as to be in contact with the upper surface of the base plate 60. The rim 74 may have a diameter larger than that of the receiving portion 72 below the receiving portion 72 in the axial direction.

The base plate 60 has a sleeve holder insertion hole 65 into which the coupling rack 75 is inserted.

An inner circumferential surface 652 of the sleeve holder insertion hole 65 may be subjected to a chamfering process, and a coupling portion 752 of the coupling rack 75 may be pressed and fixed to the inner circumferential surface 652 in the outer diameter direction.

The sleeve holder insertion hole 65 may be formed to have a diameter which increases from the upper surface of the base plate 60 to the lower surface thereof through a chamfering process.

Meanwhile, the inner circumferential surface 652 of the sleeve holder insertion hole 65 and the bottom surface of the sleeve holder insertion hole 65 extending from the inner circumferential surface 652 may be rounded to have a curvature.

Hereinafter, a process in which the sleeve holder 70 stands vertically on the base plate 60 by being inserted and fixed to the sleeve holder insertion hole 65 of the base plate 60 will be described.

After the coupling rack 75 of the sleeve holder 70 is inserted into the sleeve holder insertion hole 65 of the base plate 60, the coupling rack 75 may be fixed to the base plate 60 by caulking or spinning.

At this time, the inner circumferential surface 652 of the sleeve holder insertion hole 65 is in contact with the outer circumferential surface of the coupling rack 75. Since the inner circumferential surface 652 of the sleeve holder insertion hole 65 is subjected to the chamfering process, the coupling area between the coupling rack 75 and the sleeve holder insertion hole 65 increases. Accordingly, the fixing force between the sleeve holder 70 and the base plate 60 is improved, and thus improved verticality can be achieved.

Furthermore, the bottom surface of the rim 74 may be bonded to the upper surface of the base plate 60 by an adhesive 655.

When the bottom surface of the rim 74 and the upper surface of the base plate 60 are bonded by the adhesive 655, the verticality and internal rotational force of the sleeve holder 70 on the base plate 60 may be further increased.

With reference to FIG. 3, a radius of curvature defined by the inner circumferential surface 652 of the sleeve holder insertion hole 65 of the base plate 60 and a bottom surface 654 of the base plate 60 is limited by the thickness of the base plate 60.

In order to make the motor 10 slimmer, the base plate 60 may be designed to have a thickness of 0.8 mm or less. Meanwhile, when the base plate 60 has a thickness of 0.05 mm or less, the base plate 60 may not support the entire weight of the motor 10 and internal rotational force induced by high-speed rotations may be reduced. Also, the base plate 60 having a thickness of 0.05 mm or greater is intended to have a thickness equal to or greater than a minimum value in the radius of curvature being naturally produced when the sleeve holder insertion hole 65 is pressed. Accordingly, when the radius of curvature of the sleeve holder insertion hole 65 is R1, $0.05 \text{ mm} \leqq R1 \leqq 0.8$ mm is satisfied.

Also, the height of the coupling portion 752 of the coupling rack 75 is also a sensitive variable in determining verticality and internal rotational force. When the height of the coupling portion 752 from the bottom surface of the coupling portion 752 to the bottom surface 654 of the base plate 60 in the axial direction is h, $h \leqq 0.6 \, R1$ is satisfied.

When the coupling portion 752 has a height of 0.6 R1 or greater, caulking or spinning may be difficult.

Also, the length of the coupling portion 752 of the coupling rack 75 is also a sensitive variable in determining verticality and internal rotational force. When the length of the coupling portion 752, extending from the inner circumferential surface 652 of the sleeve holder insertion hole 65 in the outer diameter direction, is L, $0.4 \, R1 \leqq L \leqq 1.2 \, R1$ is satisfied.

When L is equal to or greater than 1.2 R1, the time taken for caulking or spinning increases. Also, when L is equal to or less than 0.4 R1, the internal rotational force of the motor is reduced as compared with a motor manufactured to include a caulking or spinning process without performing a chamfering process or the formation of a curvature.

Figure 4:
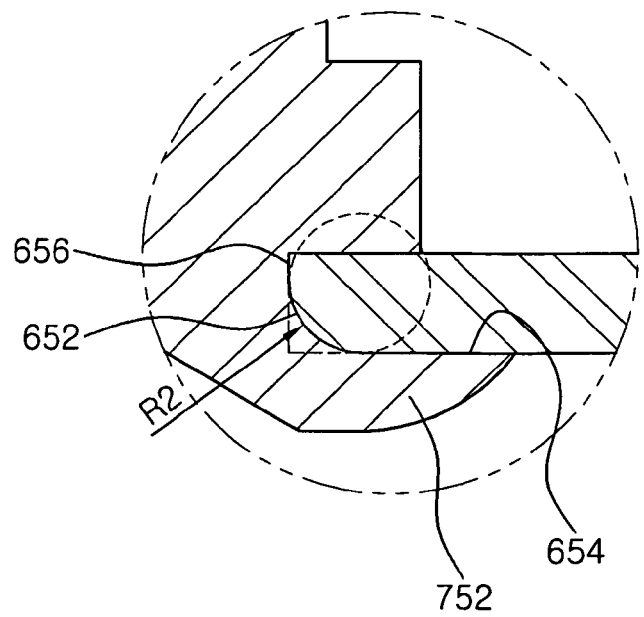
FIG. 4 is an enlarged sectional view of portion A of FIG. 1 according to another exemplary embodiment of the present invention.

FIG. 4 is an enlarged sectional view of portion A of FIG. 1 according to another exemplary embodiment of the present invention.

With reference to FIG. 4, unlike the exemplary embodiment of FIG. 3, a straight portion 656 may be formed on the inner circumferential surface 652 of the sleeve holder insertion hole 65. The straight portion 656 facilitates the transfer of force during caulking or spinning.

The sleeve holder insertion hole 65 may be formed by a chamfering process below the straight portion 65, and may be rounded to have a curvature extending from the inner circumferential surface 652 below the straight portion 65 to the bottom surface 654 of the base plate 60.

A radius of curvature R2 of this embodiment is smaller than R1 of the aforementioned embodiment.

Figure 5:
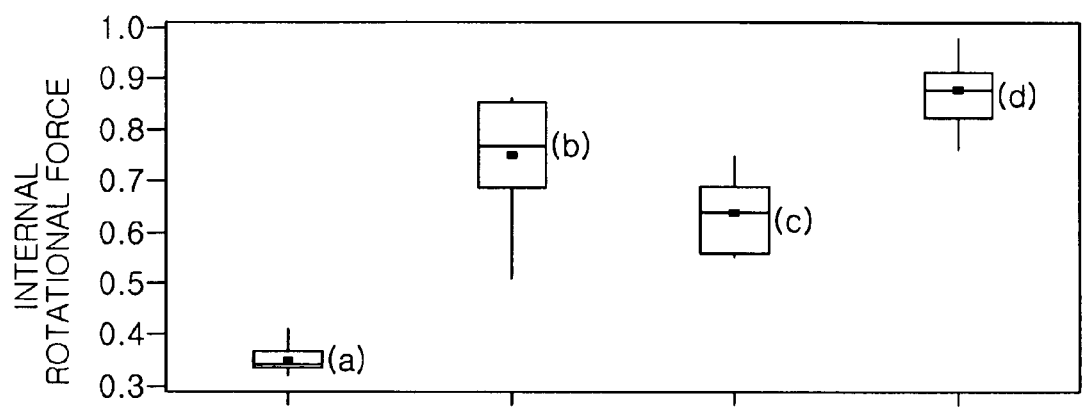
FIG. 5 is a graph illustrating the internal rotational force of a motor according to an exemplary embodiment of the present invention as compared with that of a motor having a notch structure according to the related art.

FIG. 5 is a graph illustrating the internal rotational force of a motor according to an exemplary embodiment of the present invention as compared with that of a motor having a notch structure according to the related art.

With reference to FIG. 5, the graph shows the results of measuring internal rotational force in the case of the high-speed rotations of motors having a notch structure according to the related art and motors according to exemplary embodiments of the present invention.

A vertical axis of FIG. 5 represents a relative ratio of internal rotational force. When the relative ratio of internal rotational force is 1, the sleeve holder fixed to the base plate is in an ideal state without deformation in the verticality thereof, even when extremely strong rotational force is applied thereto. In FIG. 5, (a) represents the level of internal rotational force in the case in which a sleeve holder is fixed to a base plate having a notch structure without applying an adhesive thereto according to the related art; (b) represents the level of internal rotational force in the case in which a sleeve holder is fixed to a base plate having a notch structure by applying an adhesive thereto according to the related art; (c) represents the level of internal rotational force in the case in which a sleeve holder is fixed to a base plate having a sleeve holder insertion hole subjected to a chamfering process without having a notch structure and applying an adhesive thereto according to an exemplary embodiment of the invention; and (d) represents the level of internal rotational force in the case in which a sleeve holder is fixed to a base plate having a sleeve holder insertion hole subjected to a chamfering process by applying an adhesive thereto without having a notch structure according to an exemplary embodiment of the invention.

The level of internal rotational force of (a) relative to (c) is increased by 30% or more. The level of internal rotational force of (d) relative to (b) is increased by 10% or more.

Accordingly, the internal rotational force of the motor may be improved merely by performing a relatively simple chamfering process rather than a complex process such as the formation of a notch. Also, a motor, in which a base plate is subjected to chamfering and bonding processes and a sleeve holder is fixed thereto, may have ideal internal rotational force, as compared with a motor having a notch.

As set forth above, in a motor according to exemplary embodiments of the invention, a base plate is subjected to a chamfering process without the formation of a notch such that a coupling area between a coupling rack of a sleeve holder and the base plate is increased, thereby achieving an enhancement in the verticality and internal rotational force of the sleeve holder standing on the base plate.

Also, since the sleeve holder is fixed to the base plate without the formation of a notch, the flatness of the base plate may not be distorted due to the notch.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
    a sleeve supporting a shaft;
    a sleeve holder allowing the sleeve to be fixed to an inner circumferential surface thereof and having a coupling rack protruding downwardly from a bottom surface in an axial direction; and
    a base plate having a sleeve holder insertion hole provided therein such that the sleeve holder insertion hole has a curvature defined by an inner circumferential surface thereof, in contact with an outer circumferential surface of the coupling rack of the sleeve holder, and a bottom surface thereof, in contact with a coupling portion of the coupling rack,
    wherein the sleeve holder comprises an annular rim extending in an outer diameter direction so as to be in contact with an upper surface of the base plate,
    wherein a bottom surface of the annular rim and the upper surface of the base plate are bonded by an adhesive, and
    wherein a coupling portion of the coupling rack is shrink-fitted to the inner circumferential surface of the sleeve holder insertion hole of the base plate and is fixed to the base plate by caulking or spinning.

2. The motor of claim 1, wherein the sleeve holder insertion hole has a shape corresponding to the outer circumferential surface of the coupling rack.

3. The motor of claim 2, wherein the inner circumferential surface of the sleeve holder insertion hole is in contact with the outer circumferential surface of the coupling rack.

4. The motor of claim 1, wherein the sleeve holder insertion hole has a radius of curvature R satisfying 0.05 mm≦R≦0.8 mm.

5. The motor of claim 1, wherein the coupling portion has a height h satisfying h≦0.6 R, the height being from a bottom surface of the coupling portion to a bottom surface of the base plate in the axial direction.

6. The motor of claim 1, wherein the coupling portion has a length L satisfying 0.4 R≦L≦1.2 R, the length extending from the inner circumferential surface of the sleeve holder insertion hole in an outer diameter direction.

7. A motor comprising:
a rotor case receiving a disk;
a shaft having a rotor case press-fitted thereto such that the shaft rotates in accordance with rotations of the rotor case;
a sleeve supporting the shaft;
a sleeve holder allowing the sleeve to be fixed to an inner circumferential surface thereof and having a coupling rack protruding downwardly from a bottom surface in an axial direction; and
a base plate having a sleeve holder insertion hole having an inner circumferential surface subjected to a chamfering process and having the coupling rack inserted therein,
wherein a coupling portion of the coupling rack is pressed and fixed to the inner circumferential surface of the sleeve holder insertion hole of the base plate in an outer diameter direction and fixed to the base plate by caulking or spinning,
wherein the sleeve holder comprises an annular rim extending in an outer diameter direction so as to be in contact with an upper surface of the base plate, and
wherein the sleeve holder insertion hole has a curvature defined by an inner circumferential surface thereof, in contact with an outer circumferential surface of the coupling rack of the sleeve holder.

8. The motor of claim 7, wherein the sleeve holder insertion hole has a radius of curvature R satisfying 0.05 mm≦R≦0.8 mm.

9. The motor of claim 8, wherein the coupling portion has a height h satisfying h≦0.6 R, the height being from a bottom surface of the coupling portion to a bottom surface of the base plate in the axial direction.

10. The motor of claim 8, wherein the coupling portion has a length L satisfying 0.4 R≦L≦1.2 R, the length extending from the inner circumferential surface of the sleeve holder insertion hole in the outer diameter direction.

* * * * *